United States Patent [19]
Brichard

[11] 3,801,412
[45] Apr. 2, 1974

[54] MANUFACTURE OF FLAT GLASS

[75] Inventor: Claude Brichard, Moustier/S/Sambre, Belgium

[73] Assignee: Glaverbel S.A., Watermael-Boitsfort, Belgium

[22] Filed: July 14, 1972

[21] Appl. No.: 271,756

[30] Foreign Application Priority Data
Oct. 12, 1971 Luxembourg............................ 64049
July 5, 1972 Great Britain...................... 31484/72

[52] U.S. Cl.................... 161/1, 65/99 A, 65/182 R, 65/193
[51] Int. Cl........................................... C03b 18/02
[58] Field of Search......... 65/95, 96, 193, 194, 196, 65/197, 198, 203, 204, 182 R, 99 A; 161/1

[56] References Cited
UNITED STATES PATENTS
3,551,126 12/1970 Sacrez et al.................... 65/182 R X Primary Examiner—Arthur D. Kellogg
Attorney, Agent, or Firm—Spencer & Kaye

[57] ABSTRACT

In the treatment of flat glass in a closed tank while floating on a molten bath in at least one zone of which the glass has a sufficiently low viscosity for the planeity of the upper face of the flat glass to be influenced by the heat distribution in the gaseous atmosphere above the glass, the gases constituting the atmosphere in that zone are subjected to a mixing action to increase their thermal homogeneity and thus to improve the planeity of the glass leaving the tank.

51 Claims, 8 Drawing Figures

MANUFACTURE OF FLAT GLASS

BACKGROUND OF THE INVENTION

This invention relates to a process and apparatus wherein flat glass is formed or conditioned in a covered container through which the glass is moved on a bath of molten material and in which there is at least one zone along the path of the glass where the flat glass has a sufficiently low viscosity for the planeity of the upper face of the flat glass to be capable of being influenced by the heat distribution in the gaseous atmosphere above the glass at that zone.

In the manufacture and/or conditioning of flat glass on a bath of molten material, it is known to maintain a generally neutral and/or protective atmosphere inside the tank. In this way active elements such as oxygen are prevented from entering into chemical reaction with the molten material to form compounds liable to form agents which would contaminate the glass or spoil the surface quality of the sheet or ribbon.

The flat glass leaving the tank is often not of acceptable quality, due to the presence of defects in the geometry of the surface of the glass. In particular the upper face of the flat glass is not truly flat but is impaired by defects which, although they are in many cases of small magnitude, neverthless cause angular deflections of light waves traveling through and/or reflected from the glass. These defects include surface undulations of small wave length and amplitude, which cause objects viewed by light transmitted through or reflected from the glass to appear distorted when viewed in directions more or less inclined to the normal to the surface of the glass, depending on the severity of the defect. Such distortions are variously known as ripples, ridges, broken lines, herring bones, cockles, continued lines and distortions, depending on their nature and extent. Other defects which can arise are known as "drapage" or fold lines. The defects referred to often show up quite clearly in photographs of the pattern of light rays transmitted through the glass at a shallow angle.

Due to such defects, the flat glass cannot be used in situations which call for glass of the highest optical quality. Research into the causes of such surface defects has shown that they are attributable to uncontrolled temperature gradients between one part of the gaseous atmosphere and another.

There is a natural tendency for temperature gradients to exist between central and outer regions of the tank as a result of the cooling action of the tank walls, and this in itself makes it difficult to maintain a uniform or a predetermined non-uniform heat distribution within the tank or within any given part thereof. There are however other factors which also contribute to the adverse thermal conditions. The most important disturbing factor is the relatively disordered flow of thermally heterogeneous gas currents in the protective atmosphere above the flat glass.

SUMMARY OF THE INVENTION

It is an object of the present invention to act on the gaseous atmosphere above the flat glass in such a way as to bring about a heat distribution which is more favorable to the desired result of avoiding or reducing defects in the geometry of the upper face of the flat glass.

The present invention provides a process wherein flat glass is formed or conditioned in a covered tank through which the glass is moved on a bath of molten material and in which there is at least one zone along the path of the glass where the flat glass has a sufficiently low viscosity for the planeity of the upper face of the flat glass to be capable of being influenced by the heat distribution in the gaseous atmosphere above the glass at that zone. According to the process, a mixing action is effected on gases constituting the atmosphere over at least a substantial part of the width of the path and at the at least one zone.

When this process is performed, the planeity of the upper face of the flat gass, i.e., the extent to which that upper face approaches the ideal of absolute flatness, is improved compared with the result produced when the forming or conditioning process is performed without exerting such mixing action in the gaseous atmosphere, but under otherwise identical conditions. More particularly, the mixing action avoids or reduces impairment of the upper face of the flat glass due to defects in the form of undulations of variable spacing and other defects which give the flat glass a thickness which varies from one place to another.

In the most advantageous embodiments of the invention, there is at least one zone where the temperature of the glass is in the range of 1,050° to 550° C and this is at least one zone where the mixing action is effected. Wherever such a temperature zone exists the upper face of the flat glass is particularly liable to be impaired by adverse thermal conditions in the environment above the glass.

In certain processes according to the invention, the mixing action is effected at at least one zone where the temperature of the glass is in the range 800° to 590° C. This is the temperature range where the greatest risk of surface deformation occurs in most of the usual processes for forming or conditioning flat glass on a bath of molten metal or molten metal salt. In many cases a substantial improvement in the planeity of the upper face of the flat glass can be realized by performing a mixing action in at least one zone which is in the second half of the length of the path along which the glass moves through the tank.

Preferably, in at least one zone the mixing action is effected by exerting a gas-displacing force or gas-displacing forces wholly or mainly in a direction or directions substantially normal to the path. The mixing action is generally most effective when the gas-displacing force or forces are exerted in such a direction or directions. However it is possible to achieve useful results by exerting such forces at an inclination to a vertical plane normal to the path along which the glass moves through the tank.

Preferably the mixing action is effected at a zone by exerting a gas-displacing force or gas-displacing forces at such a location and of such magnitudes as to cause displacement of gases across substantially the full width of the path.

In such cases the improvement in the surface quality of the flat glass is manifest over substantially its full width. It is to be understood however that the displacement of gases across the path of the glass may be substantially confined to a part or to certain parts only of the width of the flat glass. In such a case, the improvement in quality may be realized for only one or more parts of the width of the flat glass and this is of practical value, in particular because the flat glass has normally eventually to be cut into pieces of glass some of which will derive from the higher quality parts of the flat glass formed or conditioned in the tank. Herein, the "width" of the flat glass is taken to be the dimension of the flat glass measured horizontally and normal to the direction of movement of the flat glass through the tank.

The invention includes processes in which a mixing action is effected at at least one zone by exerting a gas-displacing force or gas-displacing forces continuously. Such embodiments of the invention afford the advantage of simplicity by avoiding the need for timing the application of the gas-displacing forces or for producing excessively high force levels.

The invention also includes processes in which a mixing action is effected at at least one zone by exerting a gas-displacing force or gas-displacing forces periodically. The periodic exertion of a gas-displacing force involves the periodic disturbance of the state of the atmosphere over the molten glass. By bringing about such a periodic disturbance it is possible to prevent the establishment or persistence of steady dynamic conditions, such as could possibly result from the exertion of a gas-displacing force continuously and which might possibly be associated with a new adverse heat distribution above the glass.

Thus, if there are periods of force exertion alternating with periods in which no force is exerted, there is less opportunity for a steady dynamic state of the gases in the tank to become established or approached then if gas-displacing forces are exerted continuously, unless the magnitude of such continuously exerted forces fluctuates, as it may do, with time. If there is a fluctuation in the magnitude of the gas-displacing forces then, of course, it is equally possible to work with continuous forces and at the same time ensure that the environmental conditions are disturbed so that at no time does a steady dynamic condition of the gases become established.

Advantageously, a mixing action is effected at at least one zone by the periodic exertion of gas-displacing forces in one direction and in a reverse direction across such path, the forces acting in the different directions across the path being exerted out of phase with each other thereby to cause displacement of gases first in one direction across such path and then in a reverse direction across such paths. Such to-and-fro motion of gases has been found to be particularly effective in mixing masses of gases which would normally be at places well spaced apart across the path of movement of the glass, without it being necessary to be highly selective in the choice of force magnitudes.

Advantageously, each exertion of force in one direction immediately follows or coincides with, i.e., occurs no earlier than the relaxation of the force previously exerted in the reverse direction. By observing this condition, the gases at the zone or zones where the forces are exerted are continuously subjected to displacement in one or the other direction across the path of the glass so that a steady dynamic state of the gases at such zone or zones cannot become established. By way of example, a very good mixing action can be effected at a given zone by exerting out of phase forces in directly opposite directions at locations which are directly opposed across the path of the glass at that zone.

In certain embodiments of the invention in which a mixing action is effected by the exertion of gas-displacing forces in one direction and in a reverse direction, out of phase, the forces are exerted according to a cycle having two phases in one of which a force or forces are exerted to cause displacement of gases in one direction across the path and in the other of which a force or forces are exerted to cause displacement of gases in the reverse direction across such path, there being at least one such cycle every 10 minutes.

Experiments have shown that the mixing action is particularly effective when the force reversal frequency is one cycle every 10 minutes or faster.

In particularly, advantageous embodiments of the invention, gas-displacing forces are exerted to cause gases to follow a closed circuit in the course of which the gases move across the path at at least one zone. In general, a very marked improvement in the planeity of the upper face of the glass can be achieved by imparting such a circulatory movement to gases in the atmosphere above the glass.

Preferably, gases are caused to follow at least one closed circuit wholly within the free atmosphere within the tank. This has the advantage of rendering unnecessary the provision for the withdrawal of gases from the tank and the guidance of such gases along external paths preparatory to their reintroduction into the tank.

In certain processes, the gases are caused to follow at least one closed circuit the general plane of which is substantially vertical. When proceeding in that way, the circulatory movement of the gases can exert a mixing action which is substantially confined to a given zone along the path of the glass.

In other embodiments of the invention gases are caused to follow at least one closed circuit the general plane of which is substantially horizontal. The displacement of gases in a circuit which is so oriented enables the displacement of the gases to bring about a mixing action at successive zones along said path.

Particular importance is given to embodiments of the invention in which a mixing action is effected at at least one zone by a force or forces exerted by blowing gas into such zone. Forces can be exerted in that way without the need to install any moving parts in the hot atmosphere above the glass. Another important advantage of exerting gas-displacing forces by blowing is that the forces can be exerted in a well-defined direction. Advantageously, the gas blown into the tank to effect the mixing action is a gas mixture which is drawn from the atmosphere in the tank or which is of substantially the same composition as such atmosphere. By performing the process in that way it is easy to maintain a relatively constant chemical composition of the tank atmosphere so that the main characteristics of manufacture and/or treatment can be more readily controlled and/or maintained.

When exerting gas-displacing forces by blowing gas into the tank at a given zone or zones, it is preferable for quantities of gas to be blown into the tank simultaneously in opposite directions across the path of the glass, from locations which are adjacent vertical planes passing through opposed side boundaries of such path, the locations being so related to each other that gases constituting the atmosphere over the glass are induced to move in a closed circuit within the tank. It is thus possible for the forces exerted by the gas blown into the tank to bring about a circulation of gases within the tank, providing that the locations at which the gas is blown into the tank are appropriately related to each other.

The invention includes processes in which propulsion and suction forces are simultaneously exerted on the atmosphere in the tank at locations such as to cause gases to be displaced across the path at at least one zone in the course of following a closed circuit which extends outside the tank. It is thus possible to bring about a circulation of gases such that the gases are displaced across the path of the glass in well-defined directions without introducing any quantity of gases from sources outside the tank, which makes it an easy matter to maintain the chemical composition of the atmosphere in the tank substantially constant.

The invention also includes processes in which a mixing action is effected at at least one zone by the action of mechanical means e.g. one or more propellers, located at that zone. Although in such processes it is necessary to install one or more moving parts in the atmosphere above the glass, there is the compensating advantage that the forces can be exerted without changing the composition of the atmosphere and without the necessity to provide for the withdrawal of gases from and reintroduction of gases into the tank.

The invention is of particular potential importance in the manufacture of flat glass. Thus, in the practice of certain important processes utilizing the invention, molten glass is fed continuously into the tank at one end and spreads out to form a floating layer on the bath, and the glass is continuously withdrawn from the other end of the tank as a continuous ribbon. By applying the invention in such a process, flat glass having faces which are substantially free from defects affecting the planeity of the faces can be produced.

In conventional processes for producing flat glass on a bath of molten material, the upper face of the flat glass is often substantially impaired by surface defects such as broken lines and cross-distortion as above referred to. Moreover, the glass ribbon often exhibits general variations in thickness from one place to another across its width, due presumably to the fact that an adverse heat distribution in the atmosphere above the glass involves a difference in the cooling pattern from one point to another across the width of the ribbon so that there is a difference between the viscosities of the glass at different places in any given zone along the length of the tank.

The above-mentioned general thickness variations can be graphically represented by a line, called "the thickness profile," plotting points on a graph representing the thickness of the ribbon at intervals of, say, 10 cm across its width. The difference between the minimum and the maximum thickness values represented by the thickness profile is called the "overall thickness variation."

The quality of the flat glass judged on the basis of its thickness profile depends not only on the magnitude of the overall thickness variation but on the shape of the profile. This shape may be such that although the overall thickness variation is large, there is a substantial part of the width of the flat glass ribbon in which the thickness variation is substantially smaller so that sheets of glass cut from that part of the ribbon will be of high quality insofar as their thickness profile is concerned. By using the present invention it is possible to produce flat glass which exhibits only very small general variations in thickness over at least a substantial part of its width.

In the production of flat glass as a continuous ribbon on a bath of molten glass, the speed of the ribbon is usually quite high and this has to be taken into account in choosing the frequency at which gas-displacing forces are exerted for achieving a mixing action according to the invention, if in fact the process makes use of periodically exerted forces rather than forces which are exerted continuously. In the case where a mixing action is effected at at least one zone by periodically reversing the direction in which gas-displacing forces are exerted, it is suitable for the force exertion cycle to be performed at a frequency of up to, e.g., 60 cycles/minute, each cycle being composed of an exertion of gas-displacing forces in one direction and an exertion of gas-displacing forces in the reverse direction.

In a process for producing a continuous ribbon of flat glass, a mixing action is advantageously effected at at least one zone which is nearer said outlet end than the inlet end of the tank. Experience has shown that by observing this condition it is possible to obviate surface defects which it would be difficult to obviate by performing a mixing action only at a zone or zones in the first half of the length of the tank. In preferred processes, the mixing action is effected at or adjacent the zone where the glass leaves the surface of the bath. This appears to be the zone where the performance of a mixing action produces the most marked beneficial effect.

An alternative way of reducing or obviating surface defects in flat glass formed and/or conditioned on a bath of molten material is to disturb the atmosphere above the glass by discharging gas into the atmosphere through orifices which are distributed over at least part of the width of the path along which the glass moves through the tank, while such orifices are bodily displaced.

Accordingly, the present invention includes, by way of modification, any process wherein flat glass is formed or conditioned in a covered container through which the glass moves on a bath of molten material and in which there is at least one zone along the path of the glass where the flat glass has a sufficiently low viscosity for the planeity of the upper face of the flat glass to be capable of being influenced by the heat distribution in the gaseous atmosphere above the glass at the zone. According to the process gas is discharged into the atmosphere above the glass at at least one such zone from an orifice or orifices so that the discharging gas is distributed over at least part of the width of such path, such orifice or orifices being bodily displaced during such discharge of gas.

By exerting a mixing action on the atmosphere over the glass in that manner, defects in the geometry of the upper face of the flat glass, as above referred to, can be obviated or substantially reduced.

According to certain embodiments, gas is discharged into the atmosphere above the glass from a plurality of orifices distributed over at least part of the width of the path, while such orifices are moved in closed paths about an axis directed across such path. This pattern of orifice displacement is very simple to achieve and is very effective, the gas discharging into the atmosphere in streams which have respectively different, and varying, directions.

According to another embodiment, gas is discharged into the atmosphere from a series of orifices while such series of orifices is angularly reciprocated about a substantially vertical axis.

There are numerous other possibilities. For example, gas may be discharged from orifices in a tube which is axially bodily reciprocated or the orifices may be provided in a slide member which is reciprocated relative to the tube while the orifice or orifices are in registry with one or more slots in the tube.

As has already been stated the performance of a process according to the above-described modification of the invention, results in an improvement in the surface quality of the flat glass. In general, the improvement in the surface quality is not so great as when performing a process according to the principal embodiments. However, in cases in which the standards required for the planeity of the sheet faces are not so stringent, the modified processes give acceptable results and afford the advantage of avoiding the creation of steady dynamic conditions in the atmosphere over the glass while working with a continuous discharge of gas.

The invention includes apparatus for use in forming or conditioning flat glass, the apparatus including a covered tank which is adapted to hold a bath of molten material for supporting glass while it moves through the tank, the flat glass having, at at least one zone along its path through the tank, a sufficiently low viscosity for the planeity of the upper face of the flat glass to be capable of being influenced by the heat distribution in the gaseous atmosphere above the glass at that zone. According to the invention, means is provided for effecting a mixing action on gases constituting the atmosphere over at least a substantial part of the width of the path at at least one such zone.

Such apparatus has the important advantage that it enables flat glass to be formed or conditioned to give a product in which the upper face of the flat glass has a higher standard of planeity, this being due to the provision of means for effecting a mixing action on gases constituting the atmosphere over the flat glass.

Various advantageous, but optional, features can be incorporated into apparatus according to the invention. Most of these further features are for the purpose of providing process features which have already been described. The advantages of these further features of apparatus will be understood from what has already been stated about the corresponding process features.

Preferably, means is provided for effecting a mixing action at at least one zone which is in the second half of the length of the path along which the glass moves through the tank.

In certain embodiments of apparatus according to the invention, means is provided for effecting a mixing action at at least one zone by exerting gas-displacing forces wholly or mainly in a direction or directions across such path.

Advantageously, means is provided for effecting a mixing action at at least one zone by exerting gas-displacing forces periodically in one direction and in a reverse direction across the path, and means is provided for causing the forces acting in such different directions across such path to be alternately exerted out of phase for causing to-and-fro displacements of gases across said path. In such apparatus a control means is in certain cases provided which operates to cause the exertion of force in one direction across the path immediately to follow or to coincide with, i.e., to commence no earlier than, the relaxation of force previously applied in the reverse direction across such path.

The invention includes apparatus in which means is provided for exerting gas-displacing forces which cause gases above the glass to move in a closed circuit in the course of which they move in a direction or directions across the path at at least one such zone. Thus, in certain embodiments of apparatus according to the invention, means is provided for exerting gas-displacing forces in such a way and at such locations as to induce gases to follow a closed circuit wholly within the free atmosphere within the tank.

Preferably, means is provided for effecting a mixing action at at least one zone by blowing gas into such zone. Particular importance is attached to embodiments in which there is at least one gas ejector device at at least one zone and means is provided for discharging gas under pressure through such ejector device into such zone for effecting such mixing action.

In certain apparatus according to the invention, in which such a mixing action as aforesaid is effected by blowing gas into the tank at at least one zone, means is provided for withdrawing gas from at least one location in the free atmosphere above the glass and for blowing such gas into the free atmosphere at at least one such zone.

Apparatus according to the invention, in certain embodiments thereof, includes means for exerting gas-displacing forces over the glass by blowing quantities of gas into the tank simultaneously in respectively opposite directions across the path from locations which are adjacent vertical planes passing through opposed side boundaries of such path, at least one of which locations is at such a zone, the locations being so related to each other that such forces will induce gases constituting the atmosphere over the glass to move in a closed circuit within the tank.

In certain apparatus according to the invention, means is provided for exerting propulsion and suction forces simultaneously on the atmosphere in the tank to cause gases to be displaced across the path at at least one zone in the course of following a closed circuit which extends partially outside the tank.

The invention also includes apparatus provided with a tube having peripheral orifices and disposed at at least one such zone, and means for rotating the tube and for supplying gas under pressure into the tube to cause discharge of gas from such orifices while the tube is rotating, thereby to effect a mixing action at said zone.

Apparatus according to the invention, in certain embodiments thereof, incorporates mechanical means, e.g. one or more propellers, at at least one such zone for effecting a mixing action.

Importance is particularly attached to embodiments of apparatus according to the invention in which means is provided for feeding molten glass into the tank at one end and in which means is provided for conducting the glass from the surface of the bath of molten material in the tank and out of the opposite end of the tank as a continuous ribbon. Preferably, there is means for effecting a mixing action at at least one zone which is nearer the opposite tank end than the one tank end. In certain cases, means is provided for effecting a mixing action at or adjacent the zone where the glass ribbon leaves the surface of the bath when the apparatus is in use.

The invention includes, by way of modification, apparatus for use in forming or conditioning flat glass, and composed of a covered tank which is adapted to hold a bath of molten material for supporting glass while it moves through the tank, the flat glass having, at at least one zone along its path through the tank, a sufficiently low viscosity for the planeity of the upper face of the flat glass to be capable of being influenced by the heat distribution in the gaseous atmosphere above the glass at that zone. According to the invention, means is provided for discharging gas into the atmosphere at at least one such zone, the gas-discharging means presented one or more orifices through which the discharge of gas takes place at that zone or zones, and means for bodily displacing such orifice or orifices during such discharge of gas.

In certain apparatus according to this modification, the gas-discharging means includes at least one tube having a peripheral gas-discharging orifice or orifices and means is provided for rotating such tube about its axis during the discharge of gas therefrom.

The invention includes apparatus according to this modification wherein the gas-discharging means includes at least one tube having a peripheral gas-discharging orifice or orifices and wherein there is means for reciprocating such orifice or orifices parallel to the axis of the tube.

In some cases, the gas-discharging means in apparatus according to the invention includes at least one tube which has a peripheral gas-discharging orifice or orifices and which is disposed with its axis normal to the path of glass movement.

In certain embodiments of apparatus according to the invention, in its modified form, there is gas-discharging means composed of at least one tube which has a peripheral gas-discharging orifice or orifices and which is disposed at an inclination to a plane normal to the path but so that the gas is discharged from such orifice or orifices with a main component of movement parallel to such path.

The invention, in its modified form, also includes apparatus wherein the gas-discharging means includes at least one tube which has a peripheral gas discharging orifice or orifices and wherein there is means for causing bodily angular reciprocation of such tube during the discharge of gas therefrom.

The invention includes sheet glass when manufactured by a process or in apparatus according to the invention as hereinbefore defined.

Various embodiments of the invention will now be described with reference to the accompanying drawings. It is to be understood that the illustrated embodiments are selected merely by way of example and they are in no way limitative.

DESCRIPTION OF THE PREFERRED EMBODIMENTS

Figure 1:
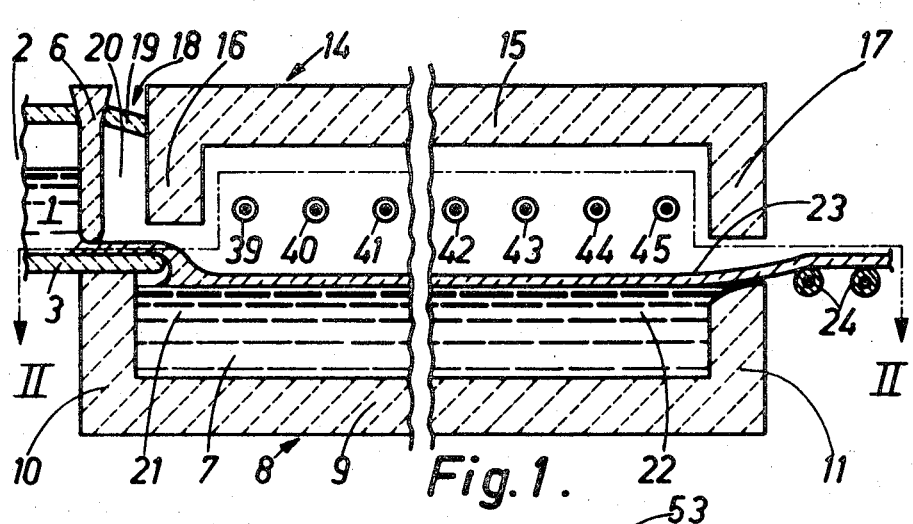
FIG. 1 is a cross-sectional elevational view, with the center broken away of a tank in which flat glass is formed on a bath of molten material and which is equipped with an embodiment of the present invention.
Figure 2:
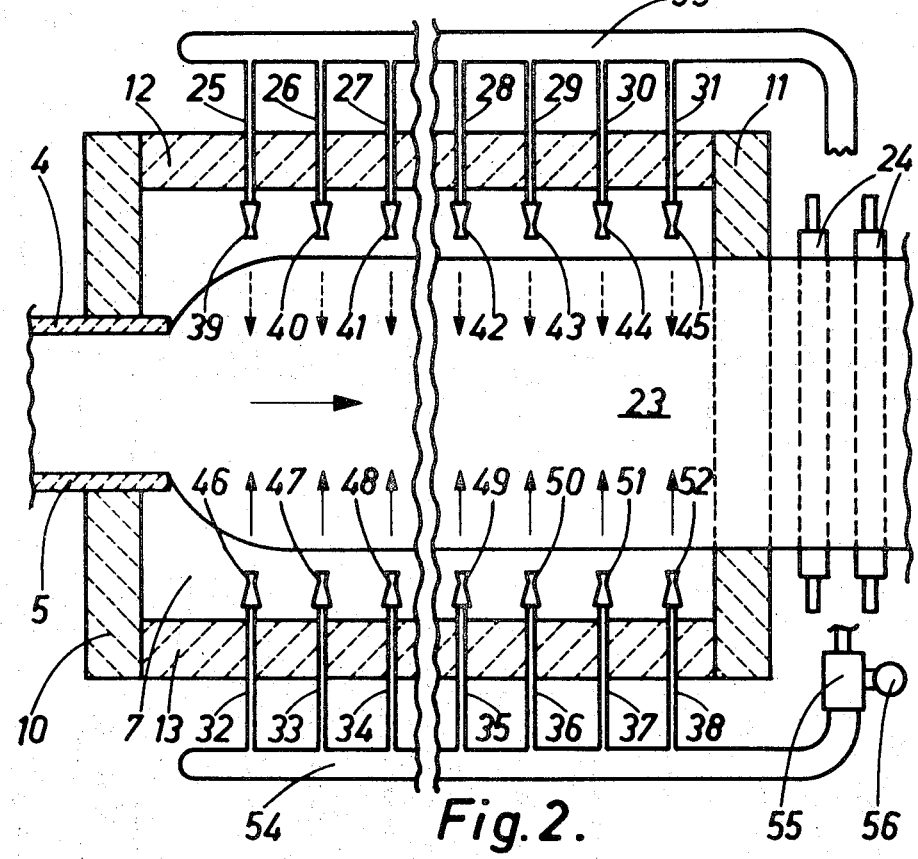
FIG. 2 is a cross-sectional plan view of the tank on the line II—II of FIG. 1.

In the device shown in FIGS. 1 and 2, molten glass 1 is supplied along a channel 2 having a bottom wall 3 and side walls 4 and 5, beneath a regulating tweel 6 and onto a bath 7 of molten metal held in a tank 8. The lower, or container, portion of the tank has a bottom wall 9, an upstream end wall 10, a downstream end wall 11, and side walls 12 and 13. The tank is covered by a roof structure 14 including a top wall 15 and upstream and downstream end walls 16 and 17. Between the regulating tweel 6 and the roof structure 14 there is a chamber 18 of which the roof wall 19 and a side wall 20 are seen in FIG. 1.

The tank is provided internally with heating means (not shown) of conventional form by which the temperatures at different zones within the tank are maintained at a predetermined value. The hottest zone in the tank is the zone 21 which is at the feed end of the tank and the temperature decreases towards the zone 22 at the exit end of the tank. By way of example, in the case that the bath 7 is a bath of molten tin, the temperature gradient may extend from about 1,000° C in the zone 21 to about 600° C at the zone 22.

The molten glass which is fed into the tank spreads out on the bath of molten metal, as is apparent from the plan view of FIG. 2, to form a ribbon 23 which is in continuous movement along the tank. Adjacent the exit end of the tank the ribbon follows a slightly upwardly inclined path away from the surface of the molten metal bath 7 and is supported on rollers 24 by which the ribbon is conveyed toward an annealing lehr (not shown).

In order that the present invention can be performed, provision is made to exert gas-displacing forces on the atmosphere over the floating glass ribbon. In this embodiment, these gas-displacing forces are exerted by blowing gas into the atmosphere first in one direction across the path of the ribbon and then in the opposite direction across such path. For this purpose two sets of seven gas injection tubes each are provided. One set includes the tubes 25–31 which pass through the side wall 12 of the float tank, and the other set includes the tubes 32–38 which extend through the opposite side wall 13 of the tank. The tubes 25–31 terminate, within the tank, in ejectors 39–45, respectively, while the tubes 32–38 are provided at their inner ends with ejectors 46–52, respectively.

Each of the ejectors is composed of a sleeve or diffuser which surrounds the discharge end portion of the appertaining injection tube and is shaped so that the discharge of gas from the injection tubes causes gases from the atmosphere within the tank to be drawn into the diffuser, to be mixed with the injected gas, and to discharge from the front flared end of the diffuser. The ejectors are of known type, namely of the Giffard or Venturi type. The use of such ejectors affords important advantages, in particular an economy in the consumption of gas under pressure, an economy of heat, the entrained gases attaining a higher temperature, an entrainment of a large quantity of environmental gases and a gas displacement rate which is appreciably in excess of the rate of delivery of gas through the ejector tube.

The set of injection tubes 25–31 branch from a supply conduit 53, whereas the injection tubes 32–38 branch from a supply conduit 54. The conduits 53 and 54 are connected to a reservoir 56, containing protective gas under pressure, via a control valve unit 55 by operation of which the reservoir 56 can be placed in communication with conduit 53 or 54.

Before the tank 14 is filled with molten metal, it is flushed through with a protective gas, e.g. a gas mixture consisting 95 percent by weight of nitrogen and 5 percent by weight of hydrogen. When the tank is filled with the protective gas and all of the air has been expelled, molten metal is introduced into the tank, or a charge of metal already present in the tank is melted. The tank is then thermally conditioned by thermal conditioning means (not shown) such as electrical resistance heaters.

Once the appropriate temperature conditions have been established, molten glass is allowed to flow into the tank from a glass melting furnace so that the molten glass floats on the bath of molten metal and spreads out to form a layer of uniform thickness which moves along the surface of the bath and is withdrawn from the exit end of the tank. The process proceeds continuously so that a continuous flat glass ribbon is formed.

A purifying system (not shown) may be provided for continuously purifying the gaseous atmosphere within the tank, e.g. by continuously withdrawing gases from the tank and recycling them into the tank via a purifying device, e.g. a column filled with caustic soda in the form of flakes or Limonite. Moreover, means may be provided for maintaining the pressure of the protective atmosphere within the tank substantially constant and therefore compensating for the leakages of gas from the tank which are in practice impossible to avoid.

In the illustrated embodiment the control valve 55 is controlled manually or automatically to cause protective gas from the reservoir 56 to be discharged into the tank first through the ejectors 39–45 in the direction indicated by the broken line arrows and then through the ejectors 46–52 in the direction indicated by the full line arrows, and so on alternately.

In one series of tests, the valve 55 was operated to cause reversal of the direction of discharge of gases into the tank, at intervals of 2.5 minutes. Thus, the set of ejectors 46–52 was operated for 2.5 minutes and the supply of protective gas to those ejectors was then cut off and the gas supply was simultaneously switched to ejectors 39–45 for a period of 2.5 minutes. In other words, each set of ejectors was operated on a 5 minute cycle divided into equal operative and idle periods.

It was found that by this action on the atmosphere above the glass ribbon, the atmosphere was influenced in such a way that the upper face of the glass ribbon was substantially free from defects, its planeity being considerably better than when the flat glass forming process was performed without operating the ejectors, but under otherwise the same conditions.

Since in the further embodiments of the invention, which are to be described with reference to the accompanying drawings, the basic tank structure, the feed channel for the molten glass and the means for conveying the glass ribbon away from the tank are the same as in the embodiment shown in FIGS. 1 and 2, such identical parts are denoted by identical reference numerals throughout the various figures, and the description of those parts will not be repeated. In describing the embodiments illustrated in FIGS. 3–8 reference will therefore only be made to those parts of the apparatus which differ from those of FIGS. 1 and 2, such parts being those which are responsible for influencing the atmosphere in the tank, above the floating glass ribbon, according to the invention.

Figure 3:
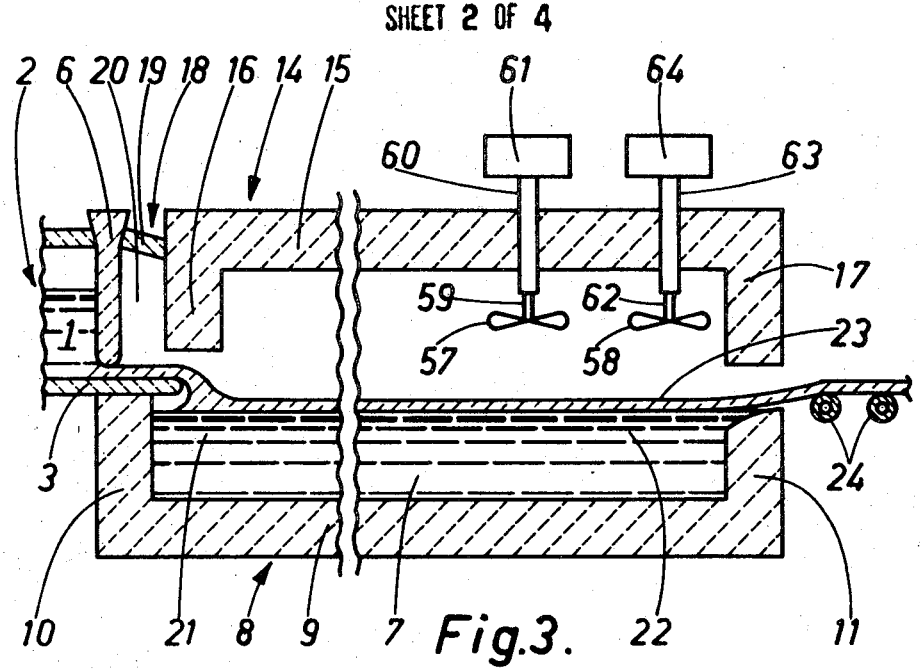
FIG. 3 is a view similar to that of FIG. 1 of another float tank provided with another embodiment of apparatus according to the invention.
Figure 8:
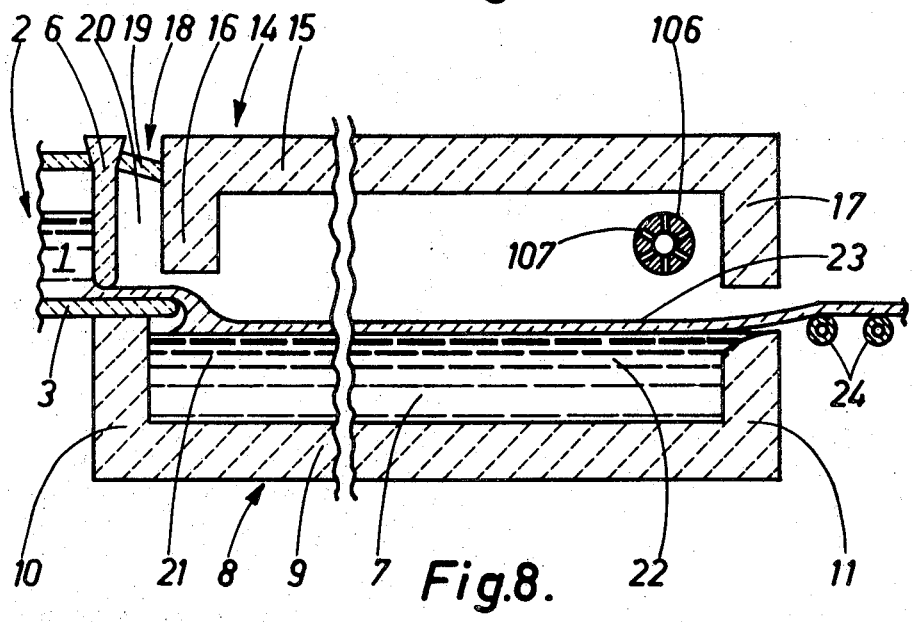
FIG. 8 is a view similar to that of FIG. 2 of a float tank having another embodiment of means for carrying out the invention.

In the embodiment illustrated in FIG. 3, two series of propellers are provided for effecting a mixing action on gases constituting the atmosphere above the glass ribbon, in the second half of its path through the tank. Only one propeller of each series is visible in the drawing, namely propeller 57 and propeller 58. In fact, each of these propellers is one of a series of propellers mounted side by side along a transverse line across the tank.

Propeller 57 is mounted on a shaft 59 which is supported in bearings within a fixed tube 60 extending through the top wall 15 of the tank. The propeller shaft 59 is driven by an electric motor 61 the speed of which can be varied in dependence on the degree of thermal homogenization required for the atmosphere of the tank and/or the thermodynamic conditions of such atmosphere at any given moment.

All of the other propellers are similarly mounted and driven. Thus, propeller 58 is mounted on a shaft 62 which is supported by bearings in a tube 63 extending through the top wall 15 of the tank and is driven by an electric motor 64.

During the formation of the flat glass ribbon 23, the propellers 57 and 58 and the other propellers which are in transverse alignment therewith are rotated, with the result that a mixing action is effected on gases constituting the atmosphere over substantially the whole of the width of the path of the glass ribbon. It has been found that in this way the planeity of the upper face of the glass ribbon can be substantially improved.

In certain tests, it was also found that the planeity of the glass ribbon was improved when the propellers were rotated intermittently rather than continuously, provided that the propellers were not idle for a sufficiently long period of time to permit reestablishment of the thermodynamic conditions which would normally prevail in the atmosphere within the tank in a conventional process. In any given process the degree of improvement in the planeity of the upper face of the glass ribbon may depend not only on the speed of rotation of the propellers, but on the relative speeds of different propellers in one transverse series and/or the relative speeds of propellers belonging to the different transverse series. It is preferable therefore to provide for the independent speed control of the propellers to enable the optimum relative speeds to be determined experimentally.

Figure 4:
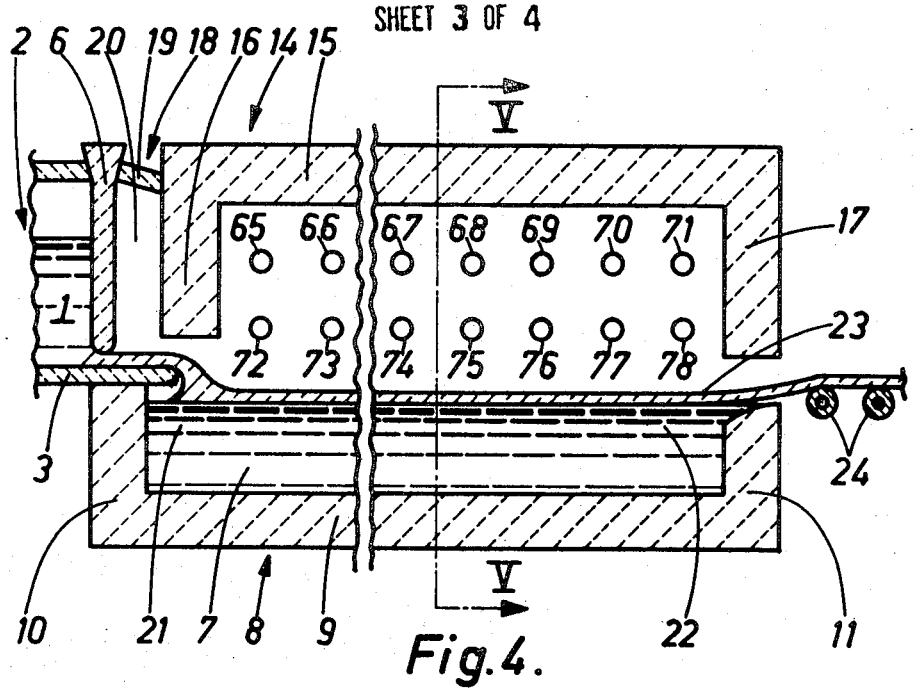
FIG. 4 is a view similar to that of FIG. 1 of a float tank which incorporates a further embodiment of the present invention.
Figure 5:
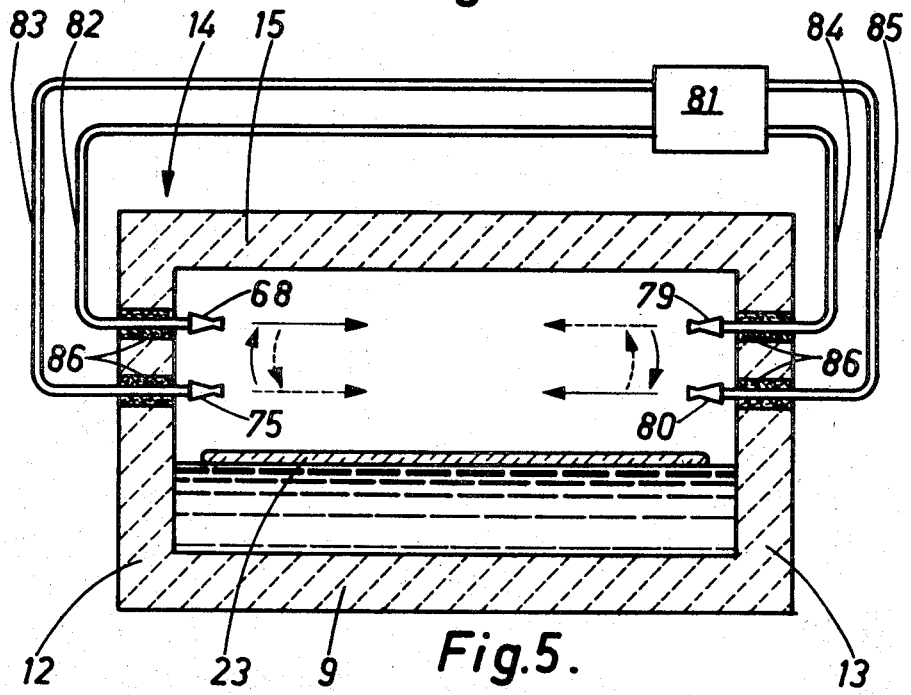
FIG. 5 is a transverse cross-sectional view taken along the line V—V of FIG. 4.

In the embodiment shown in FIGS. 4 and 5, a mixing action is effected on gases constituting the atmosphere above the floating glass ribbon by discharging gas into the atmosphere through a series of ejectors disposed internally of the tank, adjacent its side walls, the opposed series of ejectors pointing in opposite directions across the path of the ribbon. There are in fact two series of ejectors, located one above the other adjacent each of the tank side walls. The ejectors of each series are substantially equally spaced in the lengthwise direction of the tank and are distributed over the whole length of the tank.

Inasmuch as FIG. 4 is a broken-away, cross-sectional elevation, it does not show the whole of the length of the tank, a central portion of the length of the tank and the ejectors associated with that central portion being omitted. In FIG. 4 the ejectors of the upper one of the two series of ejectors which are adjacent that which, in the view of the figure, is the remote side wall of the tank, are designated 65–71, inclusive. The ejectors of the lower one of those series are designated 72–78. It will be seen that the successive ejectors of the lower series are in direct vertical alignment with the successive ejectors of the upper series. The ejectors of the other two series, which are adjacent the other side wall of the tank, are distributed along the tank and relative to each other in precisely the same way as the ejectors which appear in FIG. 4.

In FIG. 5, which is a transverse cross section on line V—V in FIG. 4, only one ejector of each of the four series is apparent, these four ejectors being ejectors 68 and 75 which are adjacent the side wall 12, and ejectors 79 and 80 which are adjacent the side wall 13.

As appears in FIG. 5, the ejectors 68,75,79 and 80, which lie in the same vertical plane, are connected to a common gas-distributing device 81 which is in turn connected to a reservoir (not shown) which contains a quantity of protective gas under pressure. The injection tubes of the ejectors 68 and 75 are in fact connected to conduits 82 and 83, respectively, which extend to the distributing device 81, and the injection tubes of the ejectors 79 and 80 are connected to conduits 84 and 85, respectively, which also extend to the gas-distributing device. The conduits 82,83,84 and 85 are gas-tightly sealed in the side walls 12 and 13 of the tank by seals 86.

The gas-distributing device 81 is controlled so that gases are discharged through the ejectors 68,75,79 and 80 in a repetitive two-phase cycle. In the first phase of this cycle gas is injected into the atmosphere in the tank through ejectors 68 and 80 transversely of the tank in opposite directions, as indicated by the full line arrows. Ejectors 75 and 79 are idle. This displacement of gases across the tank in opposite directions and at different levels induces a circulation of gases in the vertical plane because after being discharged across the tank in one direction at one of the two levels, gases tend to be drawn into the movement of gases in the opposite direction across the tank, at the other level, as is indicated by the curved full line arrows in FIG. 5. In the second phase of the cycle, gas is discharged into the tank through the ejectors 75 and 79, while ejectors 68 and 80 are idle, so that a circulation of gases within the tank is induced in the reverse direction, as indicated by the broken line arrows in FIG. 5.

The other groups of ejectors, which operate in other vertical planes along the tank, can be operated in the same way and in synchronism with the ejectors which appear in FIG. 5, so that in all of the vertical planes in which ejectors are provided, circulation of gases takes place first in one direction which is the same in all the vertical planes and then in the reverse direction, and so on alternatingly. It is of course within the scope of the invention for the circulation of gases in the different vertical planes to be out of phase and/or for the circulation of gases in one direction in a given vertical plane to taken place simultaneously with the circulation of gases in the reverse direction in one or more of the other vertical planes. In all such cases, the operation of the ejectors results in an improvement in the planeity of the upper face of the glass ribbon but the optimum conditions of circulation differ from one process to another according to the dimensions of the tank and the thermal conditions, and can be readily determined experimentally.

The supply of gas to the ejectors of the different groups, located in different vertical planes, can be controlled by one and the same gas-distributing device 81, or different such distributing devices can be provided for different groups of ejectors.

The gases discharged into the tank atmosphere through the ejectors can be preheated in such a way that gases which are discharged into the tank at different locations along its length are preheated to different temperatures and/or in such a way that gases discharging into the tank at different levels are preheated to different temperatures.

Figure 6:
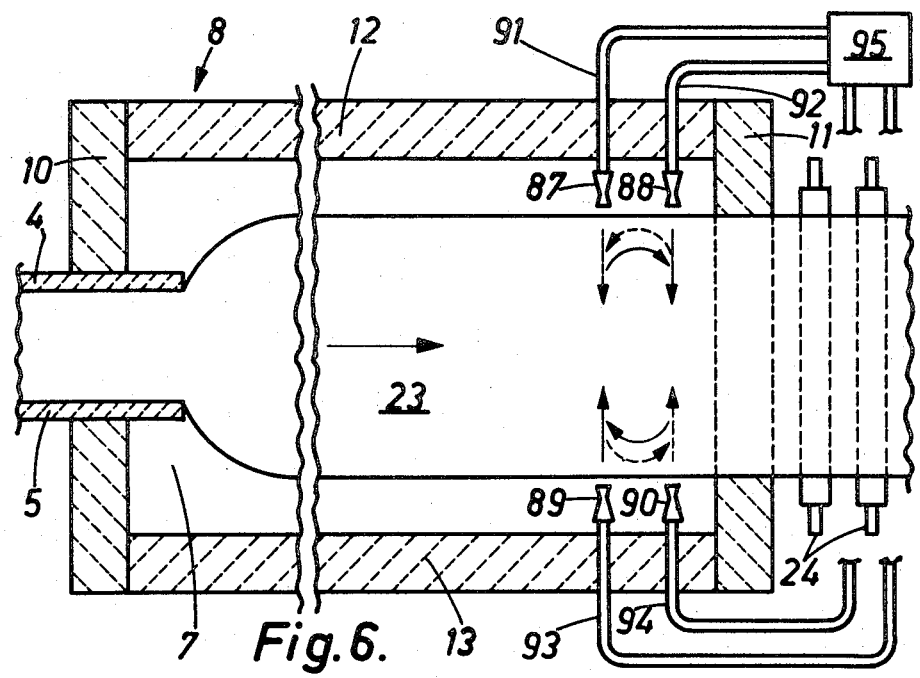
FIG. 6 is a cross-sectional plan view similar to that of FIG. 2 of a float tank equipped with another embodiment of means for carrying out the present invention.

In the embodiment represented in FIG. 6, gases are discharged into the atmosphere above the ribbon, via conduits 91–94 and through ejectors 87–90. The gas is supplied from a reservoir (not shown) of protective gas, via a gas-distributing device 95. It will be seen that in this embodiment the gas is discharged into the tank only at a region adjacent its exit end, this being the region where the glass ribbon is lifted away from the surface of the molten metal preparatory to being conveyed out of the tank.

The distributing device 95 supplies gas to the ejectors according to a two-phase repetitive cycle. In the first phase gas is supplied to the ejectors 88 and 89 to cause displacement of the gases across the path of the ribbon 23 in respectively opposite directions at the different locations along its path, as indicated by the full line arrows. In the second phase, gases are supplied to the ejectors 87 and 90 to cause displacement of gases across the path of the ribbon at each of the locations in opposite directions, as indicated by the broken line arrows. This displacement of gases in each of the phases induces a circulation of gases in the atmosphere in a horizontal plane adjacent the exit end of the tank. In one test which was performed with very satisfactory results, the gas distributing device 95 was set to operate the ejectors according to the described cycle at a frequency of five cycles per minute.

Figure 7:
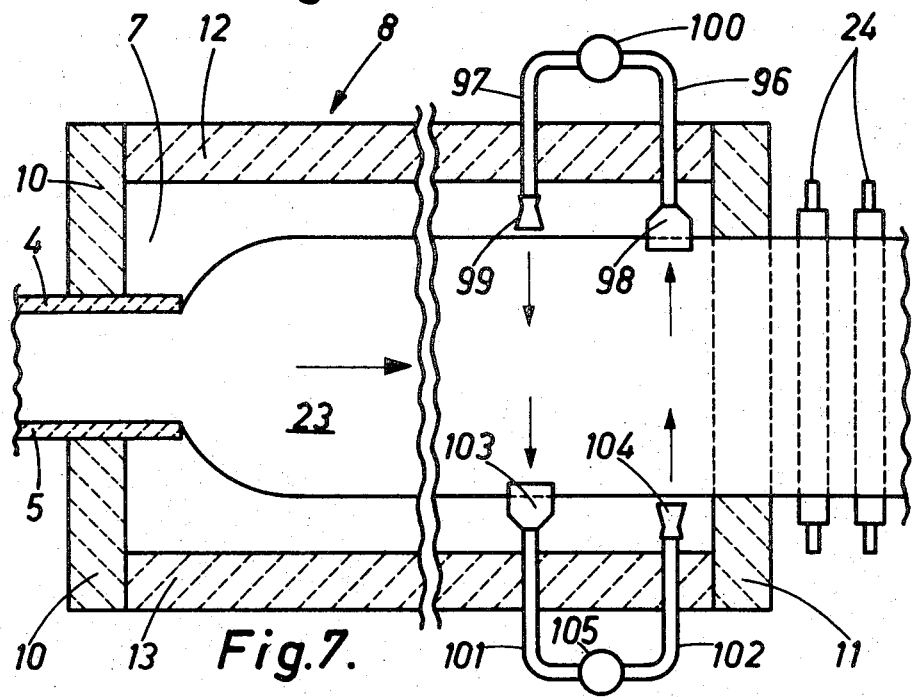
FIG. 7 is a view similar to that of FIG. 2 of a float tank incorporating another embodiment of the invention.

In the apparatus shown in FIG. 7, a pair of gas conduits 96 and 97 extends through the side wall 12 of the tank 8 at the same horizontal level and at locations which are spaced apart in the lengthwise direction of the tank. The free end of conduit 96, located within the tank, is provided with a widened inlet portion 98, whereas the free end portion of conduit 97 is fitted with a diffuser or sleeve 99 which forms with the conduit 97 a Giffard-type ejector. The conduits 96 and 97 are connected to the inlet and outlet orifices, respectively, of the casing of a pump 100.

At the opposite side of the tank there are gas conduits 101 and 102 which extend through the side wall 13 of the tank 8, at locations which are respectively directly opposite the conduits 97 and 96. The free inner end of the conduit 101 is provided with a widened inlet end portion 103, whereas the inner end portion of the conduit 102 extends into a diffuser or sleeve 104 which constitutes with the conduit 102, another Giffard-type ejector. The conduits 101 and 102 are respectively connected to the inlet and outlet orifices of the casing of a pump 105.

During the formation of the flat glass on the bath of molten metal in the tank 8, the pumps 100 and 105 are operated continuously to cause gases to follow a substantially closed circuit, which extends outside the tank.

On one side of the tank the pump 100 causes gases to be aspirated from the interior of the tank, adjacent its exit end, into the inlet portion 98 of the conduit 96 and pumps these gases through conduit 97 and the ejector 99, thereby causing gases to be drawn into the diffuser from a zone adjacent side wall 12 and to become mixed with the gases discharging from the conduit 97.

The mixed gases discharge across the path of the ribbon and are mainly aspirated into the inlet portion 103 of the conduit 101 following which they become pumped by the pump 105 through the conduit 102 and the ejector 104 so that they become discharged across the ribbon path in the opposite direction. These discharged gases mix with gases which are drawn through the diffuser from a zone adjacent the side wall 13 of the tank. Thus there is a continuous displacement of gases in respectively opposite directions across the path of the ribbon, as indicated by the arrows.

In tests which were performed with this embodiment of the invention it was found that the circulation of gases in the described manner resulted in a substantial improvement in the planeity of the upper face of the glass ribbon. In a further test, the pumps 100 and 105 were operated intermittently so as to cause a periodic circulation of gases in the above-described manner. In those tests also a substantial improvement in the planeity of the upper face of the glass ribbon, as compared with the quality of that upper face when the glass ribbon was formed without operating the pumps 100 and 105 but under otherwise identical conditions. The pumps 100 and 105 were operated at a frequency sufficient to ensure that the normal pattern of gas currents, such as prevails when the pumps 100 and 105 are not operated at all, did not become reestablished. In the apparatus shown in FIG. 8, the atmosphere above the ribbon of glass along the second half of its path through the tank is disturbed by discharging gas into the atmosphere from a tube 106 which extends transversely of the tank, over its whole width. The tube 106 is mounted in sealed bearings in the side walls of the tank and is connected to driving means (not shown) which during the production of the flat glass, rotates the tube 106 about its own axis. At the same time, protective gas having substantially the same composition as the normal protective gas atmosphere within the tank is supplied under pressure from a suitable source, into the tube 106 and this gas continuously discharges into the atmosphere within the tank through a plurality of discharge orifices 107 which are formed in the wall of the tube and are distributed over its entire length. By virtue of the rotation of the tube 106, the discharging streams of gas are discharged in various and varying directions into the interior of the tank. Experience has shown that this discharge of gas influences the environmental conditions within the tank in such a way as to create a more favorable heat distribution over the ribbon with the result that the planeity of the upper face of this ribbon is substantially improved.

In a modification, the tube 106 was rotated intermittently, rather than continuously, but at sufficiently frequent intervals to prevent a normal pattern of currents from becoming established within the interior of the tank at its downstream end.

In a further modified apparatus (not shown) the tube 106 was replaced by a tube having in its wall a series of slots running longitudinally of the tube and angularly spaced around its axis. The tube was stationary, but during the discharge of gas through the slots, a cylindrical screen or sleeve, surrounding the tube, was displaced in such manner as to create jets of gas undergoing displacement within the tank.

In a further modification (not shown) a tube such as the tube 106 was used, but the tube was mounted for axial displacement and during the production of the glass ribbon the tube was axially reciprocated so that the discharging streams of gas swept to-and-fro transversely within the tank. In this way the discharging streams of gas were caused to effect a mixing action on gases within the interior of the tank, which was found to result in a substantial improvement in the planeity of the upper face of the ribbon. It was found that in the case that the tube was axially reciprocated as aforesaid, an improvement in the quality of the glass ribbon could be achieved even without rotating the tube about its axis.

In another modification, a tube similar to the tube 106 was used but it was mounted for to-and-fro angular displacement about a vertical axis located centrally of the length of the tube. During the formation of the glass ribbon, gas was discharged from the tube while it was subjected to such angular reciprocation. The discharge of gas from the moving orifices caused an improvement in the heat distribution within the tank with the result that the planeity of the upper face of the ribbon was substantially better than when no gases were discharged from the tube and the tube was stationary, the process being carried out otherwise under identical conditions. The angularly displaceable tube was mounted so that it could also be reciprocated parallel to its axis during its angular reciprocation and it was found that when the process was performed so that the tube was both angularly and axially reciprocated during the discharge of gas therefrom the improvement in the planeity of the upper face of the glass ribbon was even more marked.

The invention has been illustrated with reference to processes in which flat glass is formed on a bath of molten material.

As already indicated, however, the invention can be usefully applied in processes in which flat glass is treated on a bath of molten material. Thus, in a further embodiment of the invention (not shown), sheets of flat glass were treated on a bath of molten salt in a covered tank, the treatment being, e.g., a chemical tempering or a coloring treatment. The sheets were introduced in semiplastic state through one side of the covered tank and during the treatment of the sheets on the bath of molten material they were moved across the surface of the bath of molten material toward the opposite side of the tank from which the sheets were removed after the treatment. By way of example, such displacement of the sheets can be effected by devices of known type, e.g., immersed rollers or endless rotating chains on which the margins of the sheets are supported.

During the treatment of the glass sheets within the tank, a mixing action was effected on the atmosphere within the tank, at at least one zone, over at least a substantial part of the width of the path along which the sheets were displaced. In one particular process, such mixing action was effected by discharging gas into the atmosphere within the tank, first in one direction across such path and then in the opposite direction across such path, at a frequency of one cycle every two minutes, each cycle including a period of discharge of gas in one direction and an equal period of discharge of gas in the opposite direction. It was found that as a result of this mixing action the upper faces of the glass sheets were of better quality and the glass sheets had better optical properties than sheets treated in the same manner but without effecting a mixing action of gases within the tank.

By way of example, in a process for treating sheets on a bath of molten material, the bath may be constituted by a mixture of salts containing (in percentages by weight): 20–30 percent sodium chloride, 40–60 percent barium chloride, 13–18 percent potassium chloride and 7–13 percent lithium chloride. A particularly satisfactory bath composition within the aforesaid range is composed of the following salts in the stated percentages by weight: barium chloride 50 percent; sodium chloride 25 percent; lithium chloride 10 percent; and potassium chloride 15 percent. Such a composition is particularly useful for protecting glass sheets in the plastic state and prevents excessive compressive stresses from being set up in the surface layers of sheets being treated, during the cooling of the sheets.

It will be understood that the above description of the present invention is susceptible to various modifications, changes and adaptations, and the same are intended to be comprehended within the meaning range of equivalents of the appended claims.

I claim:

1. In a process for treating flat glass in a covered container through which the glass is moved on a bath of molten material and in which there is at least one zone along the path of the glass where the flat glass has a sufficiently low viscosity for the planeity of the upper face of the flat glass to be capable of being influenced by the heat distribution in the gaseous atmosphere above the glass at that zone, the improvement comprising blowing gases at that zone to provide a positive mixing of the gases constituting the atmosphere over at least a substantial part of the width of the path at that zone.

2. A process according to claim 1 wherein the temperature of the glass at that zone is in the range 1,050° to 550° C.

3. A process according to claim 2 wherein the temperature of the glass at that zone is in the range 800° to 590° C.

4. A process according to claim 1 wherein said step of blowing is carried out in a zone which is in the second half of the length of such path.

5. A process according to claim 1 wherein said step of blowing is carried out by exerting a gas-displacing force at least mainly in a direction substantially normal to such path.

6. A process according to claim 5 wherein the gas-displacing force is exerted at a location and has a magnitude such as to cause displacement of gases substantially across the full width of such path.

7. A process according to claim 5 wherein the gas-displacing force is exerted continuously.

8. A process according to claim 5 wherein the gas-displacing force is exerted periodically.

9. A process according to claim 8 wherein the gas-displacing force is exerted at a frequency such that a steady dynamic state of the gases constituting the atmosphere above the glass at that zone does not become established for a sufficiently long period for the glass to be adversely affected thereby.

10. A process according to claim 8 wherein there are a plurality of gas-displacing forces acting periodically in respectively opposite directions across such path, the forces acting in the opposite directions across the path being exerted out of phase thereby to cause displacement of gases first in one direction across such path and then in the reverse direction across such path.

11. A process according to claim 10 wherein each exertion of force in one direction commences no earlier than the relaxation of the force previously exerted in the reverse direction.

12. A process according to claim 11 wherein the oppositely directed gas-displacing forces act according to a cycle having two phases in one of which displacement of gases occurs in one direction across such path and in the other of which displacement of gases occurs in the reverse direction across such path, there being at least one such cycle every ten minutes.

13. A process according to claim 1 wherein the step of blowing causes the gases to follow a closed circuit in the course of which the gases move across the path at that zone.

14. A process according to claim 13 wherein the gases are caused to follow such closed circuit wholly within the free atmosphere within the tank.

15. A process according to claim 13 wherein the general plane of the closed circuit is substantially vertical.

16. A process according to claim 13 wherein the general plane of the closed circuit is substantially horizontal.

17. A process according to claim 1 wherein said step of blowing is carried out by blowing gas into the tank at such zone from the outside of said tank.

18. A process according to claim 17 wherein the gas blown to effect such mixing action is a gas mixture which is drawn from the atmosphere in the tank or which is of substantially the same composition as such atmosphere.

19. A process according to claim 17 wherein gas is blown into the tank simultaneously in opposite directions across the path from locations which are adjacent vertical planes passing through opposed side boundaries of such path, at least one of which locations is at such zone, the locations being so related to each other that gases constituting the atmosphere over the glass are induced to move in a closed circuit within the tank.

20. A process according to claim 1 wherein suction forces are exerted on the atmosphere in the tank simultaneously with the blowing at locations such as to cause gases to be displaced across the path at such zone while following a closed circuit which extends partially outside the tank.

21. A process according to claim 1 wherein said step of blowing is carried out by the action of mechanical means located in such zone.

22. A process according to claim 1 in which molten glass is fed continuously into the tank at one end and spreads out to form a floating layer on the bath, and the glass is continuously withdrawn from the other end of the tank as a continuous ribbon.

23. A process according to claim 22 wherein the zone at which the mixing is effected is nearer the other end than the one end of the tank.

24. A process according to claim 23 wherein the mixing is effected adjacent the zone where the glass leaves the surface of the bath.

25. A process according to claim 1 wherein said blowing is carried out by discharging gas into the atmosphere above the glass at that zone from at least one orifice so that the discharging gas is distributed over at least part of the width of such path, and physically displacing the at least one orifice during such discharge of gas.

26. A process according to claim 25, wherein said step of discharging is carried out by a plurality of orifices distributed over at least part of the width of such path, and said step of displacing is carried out by moving the orifices about an axis extending across such path.

27. A process according to claim 25 wherein said step of displacing is angularly reciprocated about a substantially vertical axis.

28. In apparatus for treating flat glass and composed of a covered tank to hold a bath of molten material for supporting glass while it moves through the tank, the flat glass having, at at least one zone along its path through the tank, a sufficiently low viscosity for the planeity of the upper face of the flat glass to be capable of being influenced by the heat distribution in the gaseous atmosphere above the glass at that zone, the improvement comprising means arranged for blowing gases at that zone across at least a substantial part of the width of said path at said zone to provide a positive mixing of the gases constituting the atmosphere.

29. Apparatus according to claim 28 wherein said blowing means are mounted in the second half of the length of said path.

30. Apparatus according to claim 28 wherein said blowing means operate at least mainly in a direction across said path.

31. Apparatus according to claim 30 wherein said blowing means exert gas-displacing forces periodically in one direction and in the reverse direction across said path, and further comprising control means connected for causing the forces acting in the two directions across such path to be alternately exerted out of phase for causing to-and-fro displacements of gases across said path.

32. Apparatus according to claim 31 wherein said control means operate to cause the exertion of force in the one direction across said path to commence no sooner than the relaxation of force previously exerted in the reverse direction across said path.

33. Apparatus according to claim 30 wherein said blowing means cause gases above the glass to move in a closed circuit in the course of which they move in a direction across said path at said zone.

34. Apparatus according to claim 33 wherein the closed circuit is wholly within the free atmosphere within the tank.

35. Apparatus according to claim 30 wherein said blowing means comprise means for blowing gas into such zone from outside the tank.

36. Apparatus according to claim 35 wherein said means for blowing comprise at least one gas ejector device at said zone, and means connected to said ejector device for discharging gas under pressure through said ejector device into said zone for effecting said mixing action therein.

37. Apparatus according to claim 35 comprising further means for withdrawing gas from at least one location in the free atmosphere above the glass which cooperate with said means for blowing for effecting said mixing action.

38. Apparatus according to claim 35 wherein said means for blowing are disposed to blow quantities of gas into the tank simultaneously in opposite directions across said path from locations which are adjacent vertical planes passing through opposed side boundaries of said path, at least one of which locations is at said zone, said locations being so related to each other that the resulting gas-displacing forces induce gases constituting the atmosphere over the glass to move in a closed circuit within the tank.

39. Apparatus according to claim 35 further comprising means for exerting suction forces on the atmosphere in the tank simultaneously with the operation of said means for blowing to cause gases to be displaced across said path at said zone in the course of following a closed circuit which extends partially outside the tank.

40. Apparatus according to claim 35 wherein said means for blowing comprise a tube with peripheral orifices disposed at said zone, and means for rotating said tube and for supplying gas under pressure into said tube to cause discharge of gas from said orifices while said tube is rotating, thereby to effect said mixing action at said zone.

41. In apparatus for treating flat glass and composed of a covered tank to hold a bath of molten material for supporting glass while it moves through the tank, the flat glass having, at at least one zone along its path through the tank, a sufficiently low viscosity for the planeity of the upper face of the flat glass to be capable of being influenced by the heat distribution in the gaseous atmosphere above the glass at that zone, the improvement comprising means for effecting a mixing action on gases constituting the atmosphere over at least a substantial part of the width of said path at said zone, said means including mechanical means in the form of at least one propeller at said zone for effecting said mixing action.

42. Apparatus according to claim 28 further composed of means for feeding molten glass into the tank at one end and means for conducting the glass from the surface of the bath of molten material in the tank and out of the opposite end of the tank as a continuous ribbon.

43. Apparatus according to claim 42 wherein said blowing means are located nearer said opposite end than said one end.

44. Apparatus according to claim 43 wherein said zone is adjacent the place where the glass ribbon leaves the surface of said bath.

45. Apparatus according to claim 28 wherein said blowing means include at least one orifice through which discharge of gas takes place at said zone; and means for physically displacing said orifice during such discharge of gas.

46. Apparatus according to claim 45 wherein said blowing means comprise at least one tube having a peripheral gas-discharging orifice, and means for rotating said tube about its axis during the discharge of gas therefrom.

47. Apparatus according to claim 45 wherein said blowing means comprise at least one tube having a peripheral gas-discharging orifice, and means for reciprocating said orifice in a direction parallel to the axis of said tube.

48. Apparatus according to claim 45 wherein said blowing means comprise at least one tube which has a peripheral gas-discharging orifice and which is disposed with its axis normal to the path followed by glass moving through said tank.

49. Apparatus according to claim 45 wherein said blowing means comprise at least one tube which has a peripheral gas-discharging orifice and which is disposed at an inclination to a plane normal to the path followed by glass moving through said tank so that the gas discharges from said orifice with a main component of motion parallel with such path.

50. Apparatus according to claim 45 wherein said blowing means comprise at least one tube which has a peripheral gas-discharging orifice, and said means for displacing comprise means for causing physical angular reciprocation of said tube during the discharge of gas therefrom.

51. Sheet glass manufactured by the process according to claim 1.

* * * * *